United States Patent [19]
Dukette

[11] 3,895,729
[45] July 22, 1975

[54] SENSOR RESPONSIVE CYBERNETICS MACHINE

[75] Inventor: William J. Dukette, Palisades Park, N.J.

[73] Assignee: American Associated Cybernetics, Inc., New York, N.Y.

[22] Filed: July 2, 1973

[21] Appl. No.: 375,637

Related U.S. Application Data

[60] Division of Ser. No. 74,784, Sept. 23, 1970, Pat. No. 3,770,140, which is a continuation-in-part of Ser. No. 65,560, Aug. 20, 1974, abandoned, which is a continuation-in-part of Ser. No. 861,015, Sept. 25, 1969, abandoned.

[52] U.S. Cl. .............................................. 214/152
[51] Int. Cl. ............................................. B25j 9/00
[58] Field of Search ..... 214/1 CM, 1 B, 1 BB, 1 BT, 214/152; 294/110

[56] References Cited
UNITED STATES PATENTS
3,272,347  9/1966  Lemelson ................... 214/1 CM
3,422,967  1/1969  Aron ............................ 214/1 BB Primary Examiner—Robert J. Spar
Assistant Examiner—George F. Abraham
Attorney, Agent, or Firm—Alfred L. Michaelsen

[57] ABSTRACT

A machine for locating, engaging and moving an article located on a work surface. The machine includes a head movable in vertical, lateral and thrust axes, sensors along each such axis and programmer means for selectively sensitizing selected sensors to stop said head at selected positions along each such axis. In some embodiments the selected positions are manually predetermined while in other embodiments the selected positions are determined by sensors which locate the desired article.

6 Claims, 10 Drawing Figures

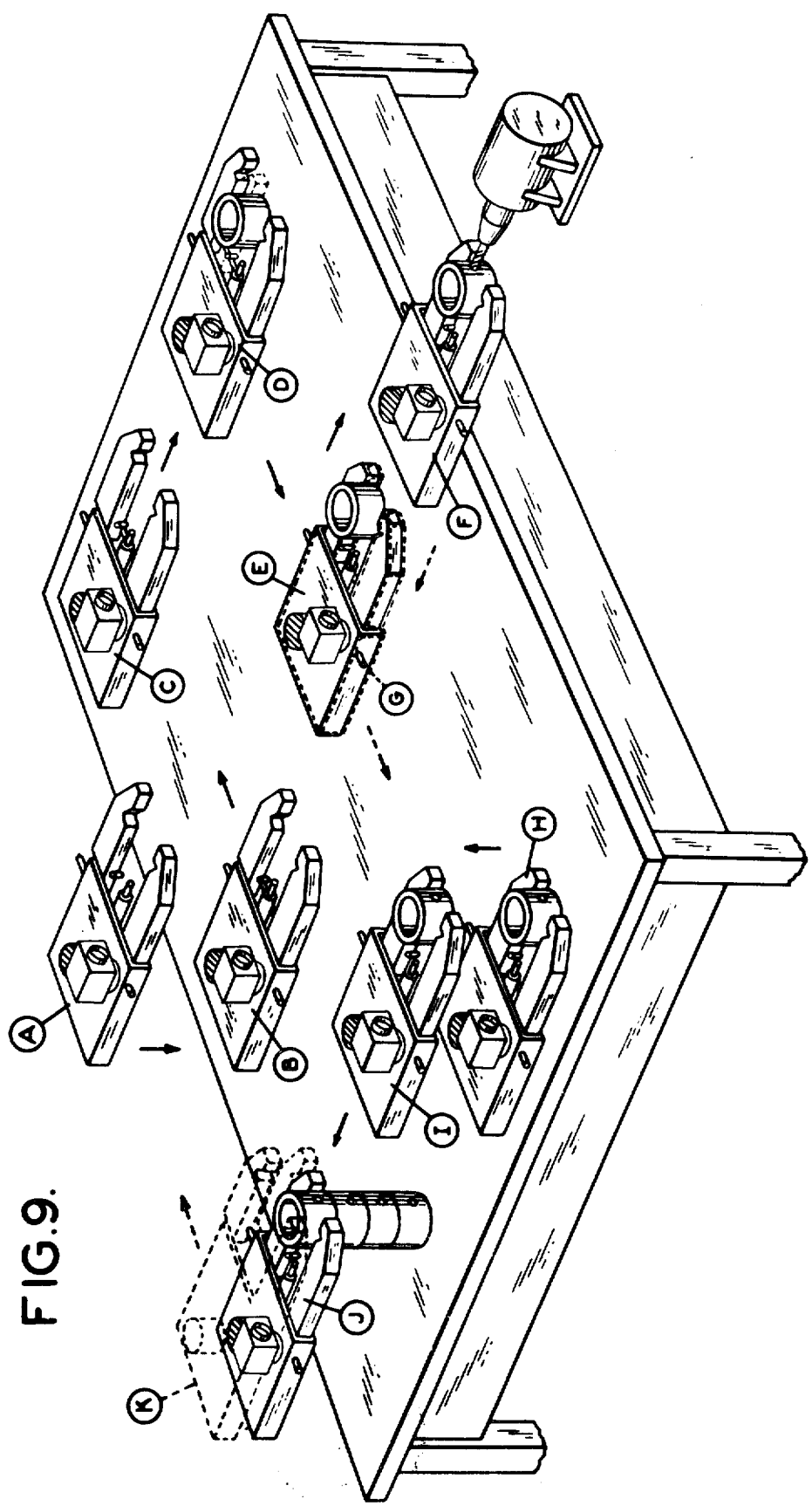

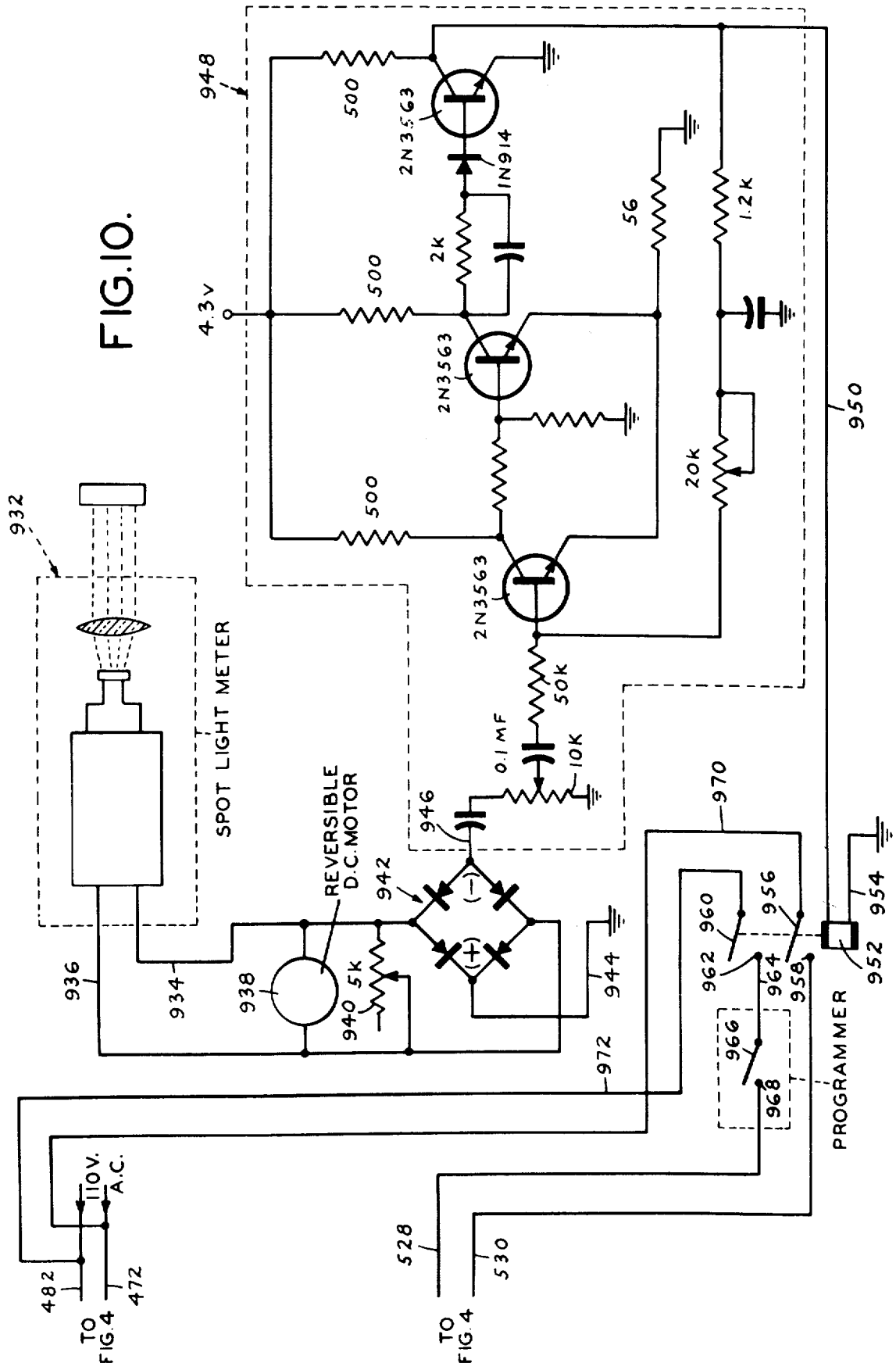

SENSOR RESPONSIVE CYBERNETICS MACHINE

This is a division, of application Ser. No. 74,784 filed Sept. 23, 1970 now U.S. Pat. No. 3,770,140. Application Ser. No. 74,784 was a continuation-in-part of Ser. No. 65,560, filed Aug. 20, 1970, now abandoned, which was a continuation-in-part of Ser. No. 861,015 filed Sept. 25, 1969 and now abandoned.

BACKGROUND OF THE INVENTION

This invention relates to a machine for handling objects and, more particularly, to a machine for locating and engaging an object within the operational range of the machine and for moving the engaged object through a preset movement cycle and for delivering the engaged object to a pre-determined location.

Many manufacturing operations, previously carried out manually, have been automated. Such automation has included machines, specifically built for a particular operation, such as, milling, drilling, turning, etc., into which the object, or part, upon which work is to be performed, must be delivered to the machine at a precise location. Such machines have been designed to perform specific operations, have required specially trained, and in many instances computer trained, operators and, perform only a specific operation. Such machines, when the specific operation is not being performed, stand idle. Because of the cost of such machines, equipment, such as a computer, to run such machines, the need for specially trained operators, the specific use of such machine, and other reasons, the use of such machines have been limited. Many operations, especially where production is small, have not been automated.

The instant invention overcomes many of the problems heretofore encountered in automated machines by providing a machine readily adaptable to a broad range of different and unrelated operations and to the service and command of other machines associated therewith as will be apparent from the following summary and description of the invention.

SUMMARY OF THE INVENTION

An apparatus for locating and engaging an article, moving the engaged article to at least one pre-set point and, after the article is at the last pre-set point, releasing the engaged article. The apparatus comprises a head, means for moving the head along an axis vertical to an article located on a supporting surface and means for moving the head longitudinally of the supporting surface. Sensor means are provided on the head responsive to movement of the head along the vertical axis toward the supporting surface for stopping the vertical axis moving means. Sensor means are also provided on the horizontal axis for stopping the horizontal axis moving means and for stopping the head on the horizontal axis when the head reaches either a pre-set point or a point determined by head-mounted sensors which are capable of locating the desired article. Means on the head engage the article on the supporting surface when the engaging means on the head is brought into contact with the article.

In contrast to most prior devices of this sort, the instant machine does not require that the object, or part, be delivered to the machine at any precise location. In the machine of the instant invention, the machine seeks out and locates the object or part and, having located the object, engages the object and moves the object through a series of programmed operations, such as drilling, boring, inspecting, etc. As various operations are performed, the machine may be programmed to inspect the object, either during movement from one operation to another, after each operation, or series of operations, and, if desired, classify, count and record such count of the inspected object.

The machine may be programmed so that, during its operating cycle, operations on the object may be transferred to and taken over by an associated machine, for example, a drill, and, after the work to be performed by the associated machine has been completed, to take over and complete further operations. The machine may also be used to index the object, or part, upon which work is to be performed, to other machines without the use of jigs or fixtures.

When the machine of the instant invention is not in use in one location, it may be easily moved to another location to perform different operations and programmed for such different operations. Programming of the machine is relatively simple and can be readily performed.

The machine of the instant invention operates in three axes, lateral, vertical and horizontal, the latter axis, for purposes of identification is hereinafter referred to as "thrust." As will be later described, each axis of the machine may be adjustable and sensitized so that, when at a preselected location, a pre-set operation will be performed. In addition to the plurality of increments on each axis and the programming unit, the machine of the instant invention also includes sensing units associated with each axis which enable the machine, when such sensing units are in operation, to seek out, locate and engage the object upon which work is to be performed and to energize the programming unit.

BRIEF DESCRIPTION OF THE DRAWINGS

The instant invention will be more fully understood from the following description of the preferred embodiment and drawings in which:

FIG. 8 is a perspective view, taken from the bottom of a modified head for the apparatus of FIGS. 1 and 2, with the movement of the head along the vertical, horizontal and thrust axis controlled in response to sensors located on such head;

FIG. 9 is a diagram of head movement, in an illustrative pattern, of the apparatus of FIGS. 1 and 2, as controlled by the circuitry of FIGS. 3 to 7; and FIG. 10 is a schematic diagram of the circuitry of a photometric sensor control for lateral movement of the apparatus of FIGS. 1, 2 and 8.

DESCRIPTION OF CERTAIN PREFERRED EMBODIMENTS

Figure 1:
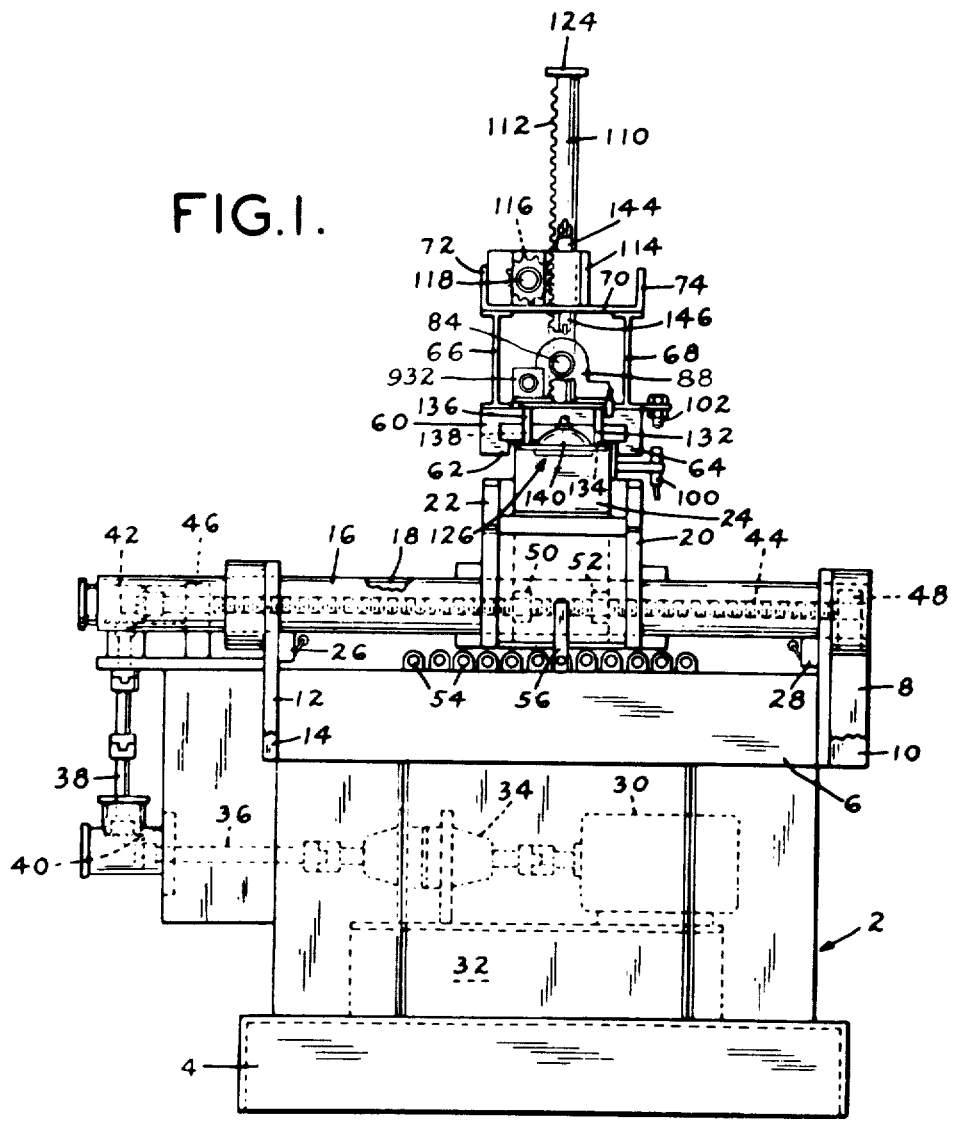
FIG. 1 is a front elevational view of the machine of the instant invention.
Figure 2:
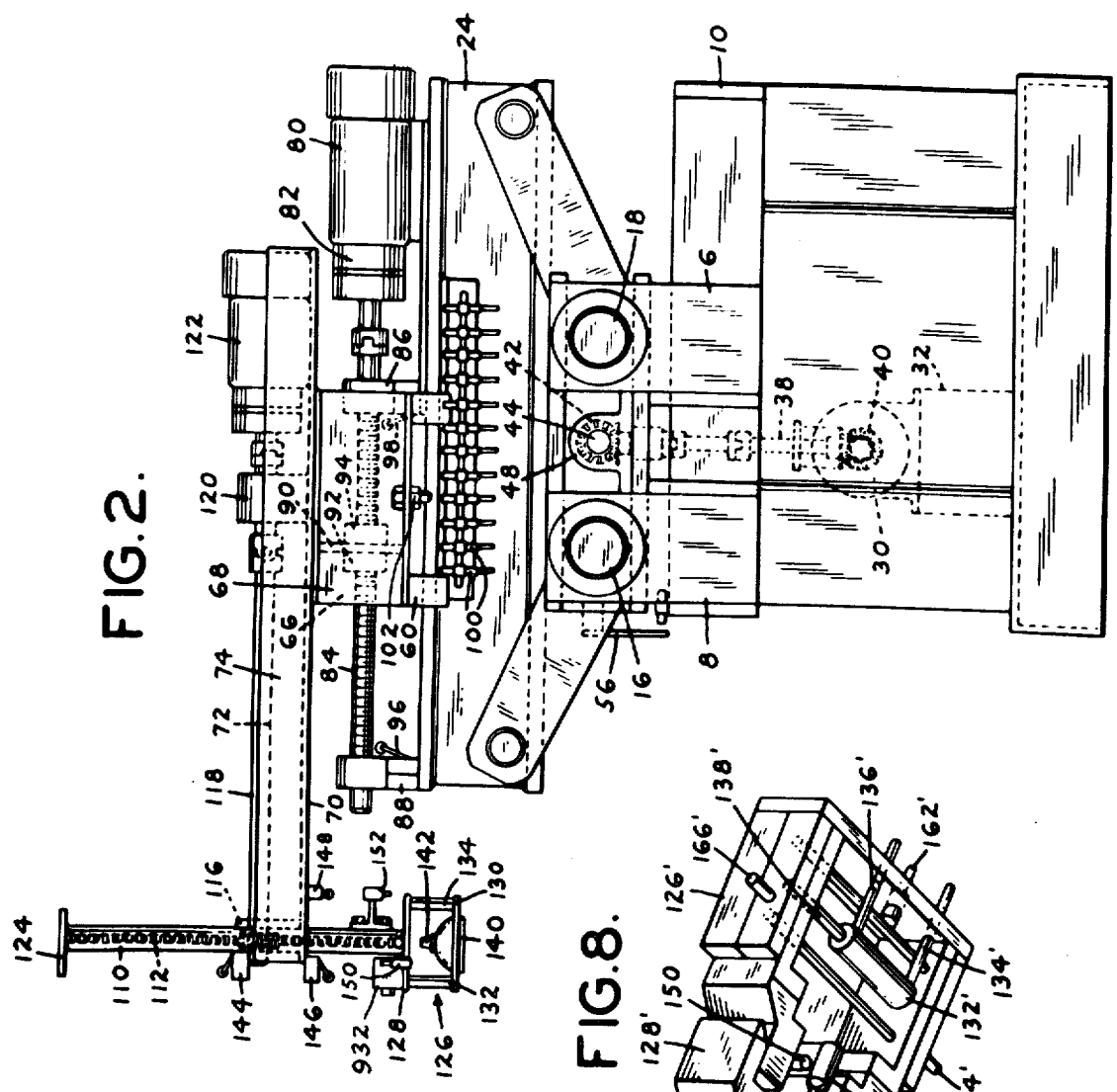
FIG. 2 is a side elevational view of the machine of FIG. 1.

Referring to FIGS. 1 and 2, the illustrated embodiment of the machine of the instant invention includes a frame, generally designated 2, having a lower base 4, for resting on the floor, and an upper base 6. Base 4 may be provided with retractable wheels, or other means, for moving the machine from place to place but, when in place, preferably, lower base 4 rests on the floor. Supports 8, 10, 12, 14 extend upwardly from upper base 6. Guide rods 16, 18 are fixed, at their opposite ends, to supports 8, 12 and 10, 14, respectively. Carriage frame 20, 22, to which lateral carriage 24 is fixedly attached, such as by welding, is mounted on guide rods 16, 18 for movement thereon, between limit switches 26, 28, mounted on supports 8, 12, for purposes hereinafter described.

Carriage drive motor 30 is fixed to motor support 32, in turn, fixed, as by for example, welding, to lower base 4. Motor 30 is connected, through clutch-brake 34, shafts 36, 38 and gears 40, 42 to the end of lead screw 44, mounted, for rotation in bearing blocks 46, 48, fixed to upper base 6. Lead screw 44 is threaded through members 50, 52, fixed, as by for example, welding, to carriage frame 20, 22, respectively, so that, as motor 30 and the clutch of clutch-brake 34 are engaged to turn lead screw 44, carriage frame 20, 22 and lateral carriage 24 are moved laterally of fixed frame 2. For purposes later described, lateral sensors 54 are mounted on upper base 6 and sensor actuator arm 56 is mounted on carriage 24 for movement with the carriage to traverse sensors 54.

Thrust carriage base 60 is mounted on top of lateral carriage 24 and mounted for sliding movement thereon. Flanges 62 and 64, on thrust base 60, engaging the under side of the upper flange on lateral carriage 24. As best shown in FIG. 1, I beams 66, 68 are fixed, as by for example, welding, to carriage base 60 and channel member 70, having upward extending flanges 72, 74, is fixed, as by for example, welding, to the upper ends of beams 66, 68 and extends outwardly beyond the end thereof, FIG. 2, for purposes later described.

Thrust motor 80 is fixed to the top of lateral carriage 24 and, through clutch-brake 82, is connected to lead screw 84 rotatably mounted in bearing blocks 86, 88 also fixed to the top of lateral carriage 24. Plate 90 is fixed, as by for example, welding, to thrust carriage base 60, beams 66, 68 and channel member 70. Threaded members 92, 94, threaded on lead screw 84, are fixed to the opposite faces of plate 90 and, in addition to being threaded through members 92, 94, lead screw 84 extends through plate 90. Limit switch 96 is fixed to bearing block 88 and limit switch 98 is fixed to bearing block 86 for purposes later described herein. Thrust sensors 100 are mounted in fixed position on lateral carriage 24 and thrust sensor actuator 102 is mounted on thrust carriage base 60 for movement with such carriage base to traverse sensors 100 for purposes later described. The fixed positions of the sensors 100 on the carriage 24 and of the sensors 54 on upper base 6 should be adjustable. For this purpose the sensors may be held in their respective positions by releaseable springs, screws or other suitable means.

Vertical adjustable member 110, having a rack 112 thereon, is mounted, at the outer end of channel member 70, in bearing block 114. Pinion 116, on shaft 118 connected through clutch-brake 120 to motor 122, mounted on channel member 70, engages the teeth of rack 112 to move vertical adjustable member 110 upwardly, and downwardly, as will be more fully described later herein. Plate 124 is fixed to the upper end of vertical adjustment member 110 and head, generally designated 126, is fixed to the opposite end of mber 110.

In the illustrated embodiment, head 126 includes upper plate 128, fixed to the end of member 110, and lower plate 130 attached by resilient members 132, 134, 136, 138 to plate 128. Suction cup 140 is mounted in plate 130 and connected, by conduit 142, to a vacuum source, not shown.

Limit switches 144, 146 are fastened to the opposite sides of bearing block 114 and sensors 148, 150 are mounted on channel member 70 and plate 128, respectively. Sensor actuator 152 is adjustably mounted on vertical adjustment member 110, for purposes hereinafter described.

As will be described in more complete detail, the machine of the instant invention may be adapted for a wide variety of operations to locate, pick up and move an object from one point within the operating zone of the machine, position and hold such object at various locations within the zone, and deliver and release such object at a point in such zone. By lengthening the axes of such machine, the machine operating zone might be enlarged. Conversely, by shortening the axes, such zone may be restricted. In any event, the object is located and picked up by head 126 which, in the embodiment of FIG. 1, is provided with a suction cup for engaging and holding the object. In the illustrated embodiment, the machine is intended for use with a bench or table, such as shown in FIG. 9, and the height of vertical adjustment member 110 is designed accordingly. Obviously, by lengthening vertical adjustment member 110, the machine may be adapted to locate and pick up objects at floor level or even below floor level.

The machine of the instant invention locates, picks up, moves and releases the object automatically and is controlled, selectively, by lateral sensors 54, thrust sensors 100 and vertical sensors 148, 150 in a manner which will be described. Once the object is located and picked up, the object is moved from location to location mechanically but under the control of selected sensors. For reasons better understood from the following description of the sensor control circuitry, precise, or precision, mechanical drives for moving the object from place to place in the three axes are not required. Clearances, slippages, and the like, normally encountered in mechanical drives, do not affect the precise movement of the object with the apparatus of the instant invention. This is of substantial importance to the precise movement and precise location of the object by the apparatus of the instant invention because errors in the mechanical drive are eliminated and not accumulated, and the need for precise and expensive drive gear is avoided.

Motors 30, 80 and 122 are reversible motors which, while the apparatus is in use, are driven constantly in the forward or reverse direction and at a speed controlled through the control circuitry hereinafter described. In the illustrated embodiment, motors 30, 80, 122 are each powered from a 220 V. A/C power supply and the control circuits are powered from a 110 V. A/C power supply. Clutch-brakes 34, 82, 120 are, except when energized as hereinafter described, in the brake position and, when energized, are put into the clutch position. When deenergized, clutch-brakes 34, 82, 120 return to the brake position.

The control circuitry, illustrated diagrammatically in FIGS. 3 to 7, is sensor and programmer responsive, the programmer selecting and connecting the responsive sensor to the control circuit and, in some instances, as will be described, activating the circuitry. The programmer, not shown, may be of any motor driven type, having a drum which, when rotated, actuates a plurality of switches. The programmer is driven intermittently and, preferably, the programmer motor is a stepper motor. The switches are aligned along the drum and actuated by detents on the drum. When actuated, the programmer motor is stepped twice. The first stepping of the programmer motor brings the detents on the drum, aligned on the drum with switches to be closed, in contact with such switches and the second stepping releases or reopens such switches. The closed switches actuate solenoids on latcher switches in the control circuitry which will be described.

Referring now, to FIGS. 3 to 7, showing the control circuitry, each axis of machine movement, that is, lateral, vertical and thrust, is provided with its own motor and control circuitry which circuitry, for each axis, is identical or substantially identical to the circuitry of the other axes. Thus, in the drawings and in the following description, the circuitry of the lateral axis will be described, it being understood that, except where otherwise noted in the description, the control circuitry of the remaining axes are identical.

Figure 3:
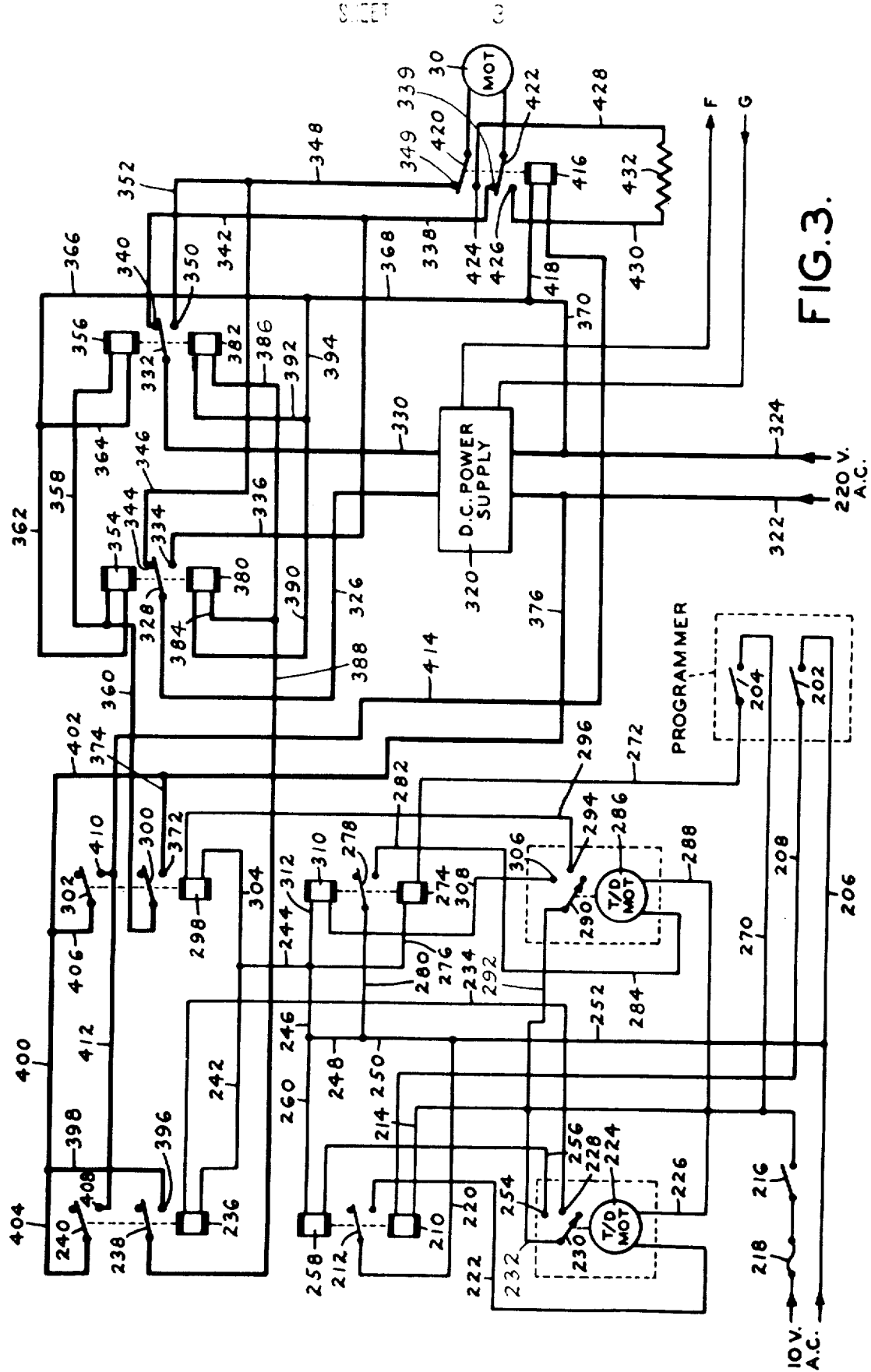
FIG. 3 is a schematic diagram of the circuitry of the motor controls of the apparatus of FIGS. 1 and 2.

As best shown in FIG. 3, the direction in which the motor is driven is controlled, from the programmer, by switches 202, 204, the detent on the program drum being set to close either switch 202 or 204, depending upon which direction the carriage to be driven by the motor is to travel during the next cycle of operation. Once one of the switches has been closed and reopened by the programmer, the motor will continue to operate in the direction determined by the closed and reopened switch and futher closing or opening of such switch by the programmer is not required. For example, once switch 202 is closed and reopened by the programmer, closing and reopening of switch 202 by the programmer is not again required until after switch 204 has been closed and reopened to operate the motor in the reverse direction and it is again desired to re-reverse the direction of motor operation.

Referring to FIG. 3, one side of programmer switch 202 is connected, by lead 206, to one side of the 110 V. A/C supply line and the other side is connected, by lead 208, to solenoid 210 of latcher switch 212. Solenoid 210 is connected, through lead 214, to the other side of the 110 V. A/C supply, through main power switch 216 and fuse 218. When the detent on the programmer drum closes switch 202, solenoid 210 is energized, latching latcher switch 212 in closed position.

One side of latcher switch 212 is connected, through leads 220, 252, to lead 206 and the other side of latcher switch is connected, through leads 222 to timer motor 224. The other side of timer motor 224 is connected, by lead 226, to lead 214. When latcher switch 212 is closed, timer motor 224 is energized and closes and then reopens timer switch contacts 228, 254. One side of timer switch arm 230 is connected, by lead 232, to lead 222 and timer switch contact 228 is connected, by lead 234, to one side of solenoid 236 of switches 238, 240. The other side of solenoid 236 is connected, by leads 242, 244, 246, 248, 250, 252, to lead 206. When timer switch arm 230 is closed with contact 228, solenoid 236 is energized and closes switches 238, 240, in the 220 V. circuit, shown in heavier lines in FIG. 4, to reverse lateral driving motor 30, as will be hereinafter described.

After closing timer switch arm 230 with contact 228, timer motor 224 opens timer switch arm 230 from contact 228 and closes timer switch arm 230 with contact 254. Contact 254 is connected, by lead 256, to one side of solenoid 258 and the other side of solenoid 258 is connected, by leads 260, 248, 250 and 252 to lead 206. When timer switch arm 230 is closed with contact 254, solenoid 258 is energized, and opens latcher switch 212, cutting off the power to timer motor 224. Latcher switch 212 and the other latcher switches shown in the drawings are two coil relays which have the characteristic of remaining in position until the opposite coil is energized. For example, switch 212, which was moved to its lower position on energization of coil 210 remained in that position until coil 258 was energized.

Still referring to FIG. 3, one side of programmer switch 204 is connected, by leads 270, 214, to one side of the 110 V. A/C supply line and the other side is connected by lead 272 to one side of solenoid 274. The other side of solenoid 274 is connected, by leads 276, 246, 248, 250, 252, 206 to the other side of the 110 V. A/C supply line. When the detent on the programmer drum closes programmer switch 204, solenoid 274 is energized and closes solenoid latcher switch 278.

One side of latcher switch 278 is connected, by leads 280, 250, 252, 206 to one side of the 110 V. A/C supply line and the other side of latcher switch 278, when solenoid 274 is energized and the switch is closed, is connected, by leads 282, 284, to one side of timer motor 286. The other side of timer motor 286 is connected, by lead 288, to the other side of the 110 V. A/C supply line. Thus, when solenoid 274 is energized and switch 278 is closed, motor 286 is energized.

Motor 286 is connected to switch arm 290. Switch arm 290 is connected, by lead 292, to lead 282. Contact 294, with which switch arm 290 closes and then reopens when timer motor 286 is energized, is connected, by lead 296, to one side of solenoid 298 of switches 300, 302. The other side of solenoid 298 is connected, by leads 304, 244, 246, 248, 250, 252, 206, to one side of the 110 V. A/C supply line. When switch arm 290 closes with contact 294, solenoid 298 is energized and closes switches 300, 302 and when switch arm 290 reopens with contact 294, switches 300, 302 are opened, all for purposes later described.

After closing and reopening with contact 294, switch arm 290 closes and then reopens with contact 306. Contact 306 is connected, by lead 308, with one side of solenoid 310. The other side of solenoid 310 is connected, by leads 312, 246, 248, 250, 252, 206 to one side of the 110 V. A/C supply line. When switch arm 290 closes with contact 306, solenoid 310 is energized and opens switch 278 to de-energize timer motor 286.

As hereinbefore noted, motors 30, 80, 122 are reversible and powered from a 220 V. A/C power supply. The 220 V. A/C supply is fed into a D/C power supply, there being a separate D/C power supply for each motor. Thus, in the control circuitry illustrated in FIG. 3, lateral motor 30 is powered from D/C power supply 320 connected, by leads 322, 324, to the opposite sides of the 220 V. A/C supply line. The output of D/C power supply 320 is connected, respectively, by lead 326, to switch arm 328, and, by lead 330, to switch arm 332. Lower contact 334, at switch arm 328 is connected, by leads 336, 338 to an upper contact 339, at switch arm 422. Upper contact 340, at switch arm 332, is likewise connected to upper contact 339, by leads 342, 338. Upper contact 344, at switch arm 328 is connected, by leads 346, 348, to an upper contact 349, at switch arm 420. Lower contact 350, at switch arm 332, is likewise connected to upper contact 349, by leads 352, 348. Upper solenoids 354, 356 of switch arms 328, 332 are connected, at one of their sides, respectively, by leads 358, 360, to one end of the arm of switch 300 and, at their other sides, by leads 362, 364, 366, 368, 370, to one side of the 220 V. A/C power supply. Contact 372 of switch 300 is connected, by leads 374, 376, to the other side of the 220 V. A/C power supply.

Lower solenoids 380, 382 of switch arms 328, 332 are connected, at one of their sides, respectively, by leads 384, 386, 388, to one end of the arm of switch 238 and, at their other sides, by leads 390, 392, 394, 368, 370, to one side of the 220 V. A/C power supply. Contact 396 of switch 238 is connected, by leads 398, 400, 402, 376 to the other side of the 220 V. A/C power supply.

The arms of switches 240, 302 are connected, by leads 404, 400, 406, 402, 376 to one side of the 220 V. A/C supply line. Contact 408 of switch 240 and contact 410 of switch 302 are connected, by leads 412, 414, to one side of solenoid 416. The opposite side of solenoid 416 is connected by leads 418, 370, to the other side of the 220 V. A/C supply line. Switches 420, 422 of solenoid 416 are normally in the position shown in FIG. 3. When solenoid 416 is energized by the closing of switch 240 or switch 302 by energizing solenoid 236 or 298, switches 420, 422 are pulled in contact with contacts 424, 426 connected, respectively, by leads 428, 430, to resistor 432 which, when connected to motor 30, dynamically brakes the motor before motor 30 is energized in the reverse direction.

Lateral motor 30, thrust motor 80 and vertical motor 122 are all operated continuously. Each motor is energized to operate in the forward or reverse direction by the motor control circuitry of FIG. 3, the direction being controlled by switches on the programmer, as hereinabove described. Motor 30 drives clutch-brake 34 which, except when energized as hereinafter described, is normally in brake position. Motors 80 and 122 drive, respectively, clutch-brakes 86, 120 which, except when energized, are normally in brake position.

Figure 4:
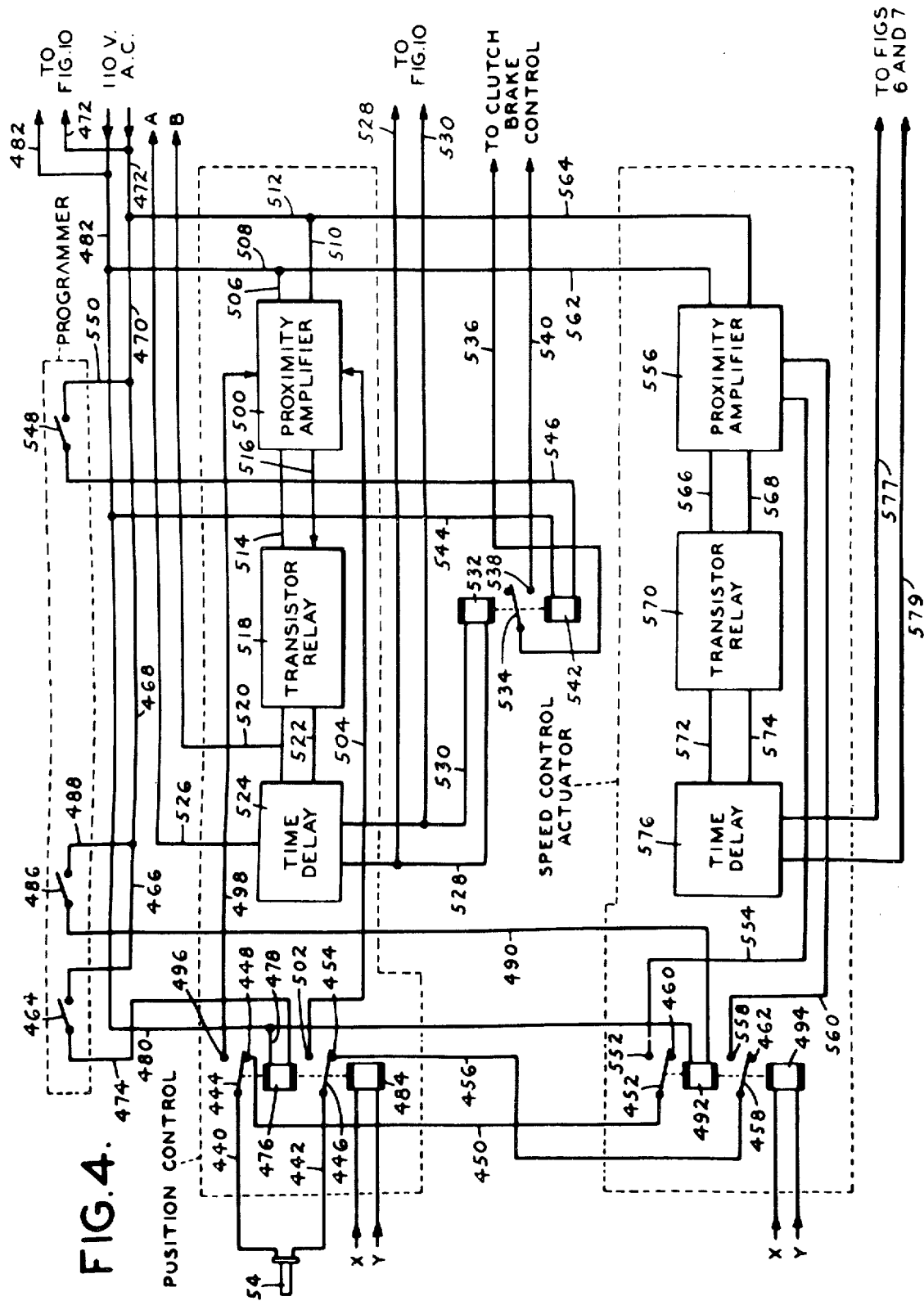
FIG. 4 is a schematic diagram of the circuitry of the sensor controls of the apparatus of FIGS. 1 and 2 and the position controls and speed control actuators controlled thereby.

Referring to FIG. 4, clutch-brake 34 of lateral motor 30 and clutch-brake 82 of thrust motor 80 are controlled by the programmer and sensors 54 and 100, respectively. For purposes of illustration, the control circuitry of clutch-brake 34 and speed control of lateral motor 30 will be described, it being understood, however, that the circuitry of clutch-brake 82 and speed control of thrust motor 80 are identical.

The number of sensors that may be employed along the lateral and thrust axes, to control the machine along the respective axis, may vary, depending upon the length of the axis and the degree of control required along such axis. During each movement of the machine from one point along the axis to another, movement of the machine is initiated by the programmer and terminated by one of the sensors, selectively connected, through a switch, not shown, on the programmer to the proximity amplifier in the position control circuit, there being one position control proximity amplifier, one transistor relay and one time delay for position control in each axis. In addition, one or more of the sensors may be selectively connected, through switches, not shown, on the programmer to control motor speed. As will be more apparent from the following description, one sensor, during one movement, may be connected to control position and, during another, to control speed. For purposes of illustration and description in FIG. 4, only one sensor is shown which will be described, with certain of the programmer switches closed, as the position control and, with other programmer switches closed, as the speed control actuator. It is to be understood, however, in any one movement of the machine from one position to the other, the same sensor would not be employed for both purposes.

Referring to FIG. 4, sensor 54 is connected, by leads 440, 442 to the arms of switches 444 and 446. Contact 448 of switch 444 is connected, by lead 450, to the arm of switch 452. Contact 454 of switch 446 is connected, by lead 456 to the arm of switch 458. As shown in FIG. 4, the arms of switches 452, 458 are against contacts 460, 462, respectively, and are open for purposes more apparent hereinafter.

Programmer switch 464 is connected, at one of its sides, by leads 466, 468, 470, 472, to one side of the 110 V. A/C power supply line and is connected, at its other side, by lead 474 to solenoid 476 of switches 444, 446. The other side of solenoid 476 is connected by leads 478, 480 and 482 to the other side of the 110 V. A/C supply line. Solenoid 484 of switches 444, 446 is connected to the X, Y leads for purposes later described.

Programmer switch 486 is connected, at one of its sides, by leads 488, 468, 470, 472 to one side of the 110 V. A/C power supply and, at its opposite side, by lead 490 to solenoid 492 of switches 452, 458. Solenoid 494 of switches 452, 458 is connected to the X, Y leads for purposes later described.

Contact 496 of switch 444 is connected, by lead 498 to proximity amplifier 500. Contact 502 of switch 446 is connected by lead 504 to proximity amplifier 500. Proximity amplifier 500 is connected by leads 506, 508, to one side of the 110 V. A/C supply line and by leads 510, 512 to the other side of the 110 V. A/C supply line. Proximity amplifier 500 is also connected by leads 514, 516 to transistor relay 518 which, in turn, is connected by lead 520 to gate control lead B and, by lead 522 to time delay 524. Time delay 524 is connected by lead 526 to gate control lead A and, by leads 528, 530 to solenoid 532. Switch 534 of solenoid 532 is connected, by lead 536, to the clutch-brake control and contact 538 of switch 534 is connected, by lead 540, to the clutch-brake control. Solenoid 542 of switch 534 is connected, by lead 544 and lead 482, to one side of the 110 V. A/C supply line, and by lead 546, to one side of the programmer switch 548. Programmer switch 548 is connected, by leads 550, 470, 472, to the other side of the 110 V. A/C supply line.

Contact 552 of switch 452 is connected, by lead 554, to speed control proximity amplifier 556. Contact 558 of switch 458 is connected, by lead 560, to proximity amplifier 556. Proximity amplifier 556 is connected, by leads 562 and 508, to one side of the 110 V. A/C supply line and, by lead 564, 512, to the other side of the 110 V. A/C supply line. Proximity amplifier 556 is also connected, by leads 566, 568, to transistor relay 570 which, in turn, in connected, by leads 572, 574, to time delay 576. The output of time delay 576 is fed by leads 577, 579 to the speed control, FIG. 6.

In the operation of the control circuitry of FIG. 4, the motor to be operated, such as lateral motor 30 or thrust motor 80 is in operation and, if movement along the axis is required, programmer switch 548 is closed by the programmer, as will be hereinafter described, energizing solenoid 542 and closing arm of switch 534 with contact 538. The clutch is then engaged. At the same time that the programmer closes switch 548, the programmer closes switch 464 connected to the sensor at a remote point on the machine at which the machine is to be stopped when it reaches the selected sensor. If, before reaching such selected sensor the movement of the machine along such axis is to be slowed down or decelerated, programmer switch 486 connected to the sensor at the point where such deceleration is to start is also closed. Obviously, switches 464 and 486 cannot be connected to the same sensor. The sensor to slow down or decelerate the motor must, in the path of movement, precede the sensor selected to stop the motor.

Considering first slowing down or deceleration, programmer switch 464, connected to the sensor at the point where deceleration is to commence, is open and programmer switch 486 is closed. Thus solenoid 476 is not energized but solenoid 492 is energized. The arms of switches 444, 446 are closed with contacts 448, 454, respectively, and the arms of switches 452, 458 are closed with contacts 552, 558, respectively, by energized solenoid 492. Sensor 54, which may be capacitance or inductance responsive, a photocell, or other responsive unit, at the point where, by the closing of switch 486, deceleration is to commence, is sensitized so that when the movable control unit on the machine, for example, arm 56, reaches the sensitized sensor, a signal will be generated and, through the connecting leads, will be fed to the proximity amplifier 556 and, from proximity amplifier 556 through transistor relay 570, time delay 576 and leads 577, 579 to the speed control, as will be hereinafter described.

Considering next, position control and still referring to FIG. 4, programmer switch 464 is closed and, through leads 474, 478, 480, 482 energizes solenoid 476, closing the arms of switches 444, 446, respectively, with contacts 496, 502. When the sensor control arm, moving along the axiss, reaches the sensitized sensor, the signal generated by sensor 54 is transmitted, through the connecting leads, to proximity amplifier 500 and from such amplifier to transistor relay 518, time delay 524 and solenoid 532. When energized, solenoid 532 opens the arm of switch 534 and disengages the clutch. The brake in the clutch-brake re-engages. Thus, the movement of the machine along the controlled axis is terminated. At the same time, transistor relay 518 and time delay 524 transmit a signal through leads A, B, for purposes more apparent hereinafter.

Figure 5:
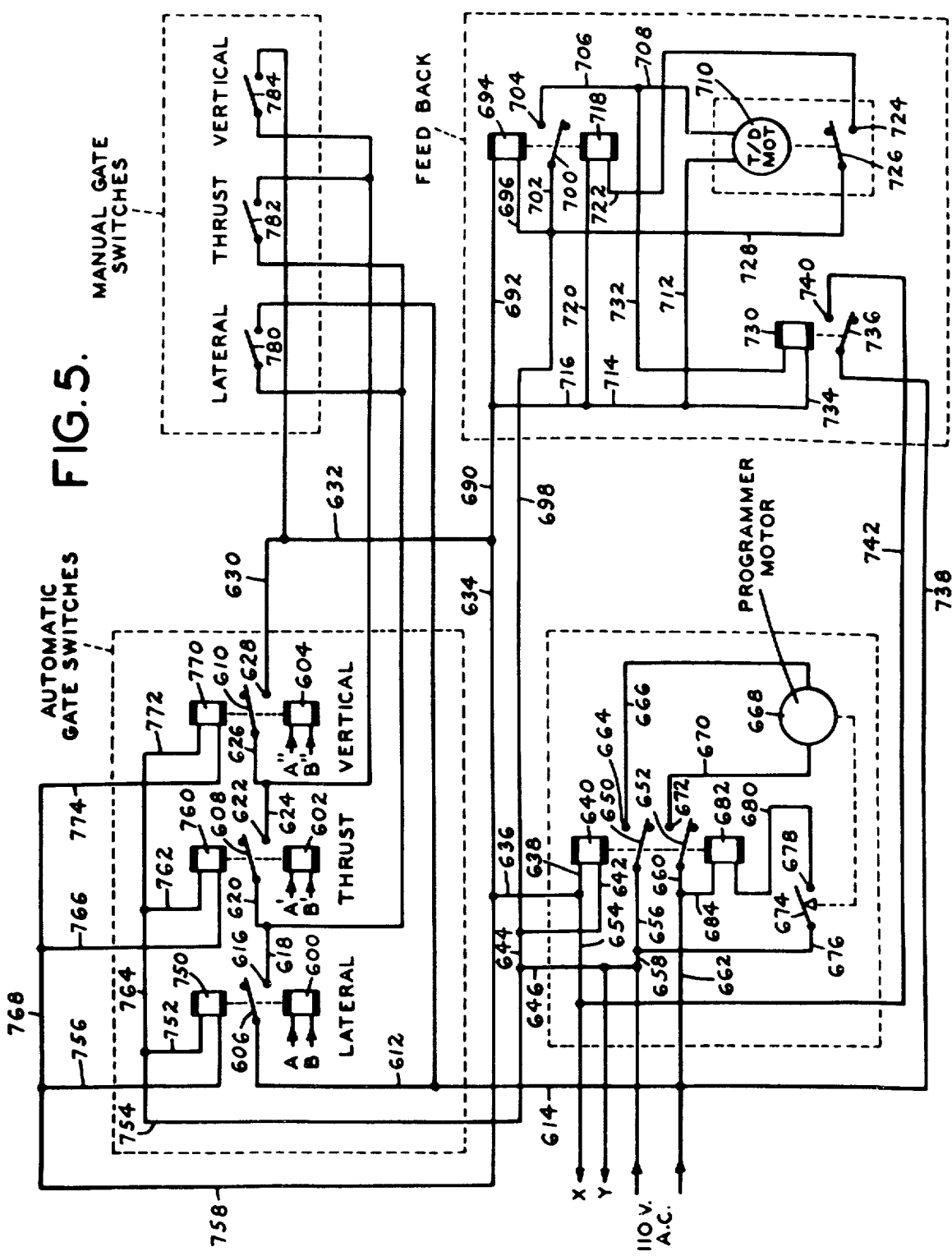
FIG. 5 is a schematic diagram of the And Gate controls, programmer motor control and feed back circuitry of the controls of the apparatus and the control circuitry of FIGS. 3, 4 and 6.

Referring, next, to FIG. 5, the signal transmitted through leads A, B, FIG. 4, from the control circuits of lateral motor 30, thrust motor 80 and vertical motor 122 are transmitted, respectively, to automatic and gate solenoids 600, 602, 604, FIG. 5, closing, respectively, switches 606, 608, 610. The signals transmitted through leads A, B, from the control circuits of the lateral, thrust and vertical motors are transmitted as the movement in the respective axis is completed and the signal is generated by the sensitized sensor, FIG. 4, in each such axis. Thus, switches 606, 608, 610 may be closed in any order. For purposes more apparent hereinafter, switches 606, 608, 610 are in series.

The arm of switch 606 is connected, by leads 612, 614, to one side of the 110 V. A/C supply line and contact 616 of switch 606 is connected, by leads 618, 620 to the arm of switch 608. Contact 622 of switch 608 is connected by leads 624, 626 to the arm of switch 610. Contact 628 of switch 610 is connected by leads 630, 632, 634, 636, 638 to one side of solenoid 640. The other side of solenoid 640 is connected by leads 642, 644, 646 to the opposite side of 110 V. A/C supply line. Thus, when switches 606, 608, 610 are closed by the signals transmitted through leads A, B of the control circuits of the lateral, thrust and vertical axes, respectively, solenoid 640 is energized and closes switches 650, 652 of solenoid 640. At the same time, a signal is transmitted through the X, Y leads connected, respectively, through lead 654 to lead 638 and to lead 646. The signal transmitted through the X, Y leads, FIG. 5, is transmitted to and received by solenoids 484, 494, FIG. 4, and reset switches 444, 446, and 452, 458, respectively, to the position shown in solid line, FIG. 4.

The arm of switch 650 is connected by leads 656, 658, to one side of the 110 V. A/C supply line and the arm of switch 652 is connected by leads 660, 662, to the other side of the 110 V. A/C supply line. Contact 664 of switch 650 is connected, by lead 666 to one side of programmer motor 668 and the other side of programmer motor 668 is connected by lead 670 to contact 672 of switch 652. Thus, when switches 650 and 652 are closed by the energization of solenoid 640, programmer motor 668 is energized and, after a preset interval, closes switch 674. The arm of switch 674 is connected, by leads 676 and 658 to one side of the 110 V. A/C supply and contact 678 is connected by lead 680 to one side of solenoid 682. The other side of solenoid 682 is connected by leads 684 and 662 to the opposite side of the 110 V. A/C supply line. Thus, when switch 674 is closed by programmer motor 668, solenoid 682 is energized and re-opens switches 650, 652 to stop programmer motor 668.

In addition to energizing solenoid 640, switches 606, 608, 610, when all switches are closed, are connected through leads 630, 632, 690, 692 to one side of solenoid 694. The other side of solenoid 694 is connected, by leads 696, 698, 646 to one side of the 110 V. A/C supply line. Thus, through leads 614, 612, closed switches 606, 608, 610, and the leads associated therewith, solenoid 694 is energized to close switch 700.

The arm of switch 700 is connected by lead 702, 698, 644 and 646 to one side of the 110 V. A/C supply line. Contact 704 of switch 702 is connected, by leads 706, 708, to one side of timer motor 710. The other side of timer motor 710 is connected, by leads 712, 714, 716, to lead 690, 634, 636, 638. One side of solenoid 718 is connected, by lead 720, to lead 716 and the other side of such solenoid is connected, by lead 722, to contact 724 of timer motor switch 726. The arm of switch 726 is connected, by lead 728, to lead 698. Thus, when solenoid 694 is energized and the arm of switch 700 is closed with contact 704, time delay motor 710 is energized. After a predetermined time interval, timer motor 710 closes switch 726, energizes solenoid 718 and reopens switch 700.

Solenoid 730 is connected, at one side, by lead 734 to lead 714. The arm of switch 736 controlled by solenoid 730 is connected, by lead 738, to one side of the 110 V. A/C supply. Contact 740 of switch 736 is connected, by lead 742, to lead 654, so that the closing of switch 736 will energize solenoid 640.

Lateral gate solenoid 750 is connected, at one of its sides, by leads 752, 754, 646 to one side of the 110 V. A/C supply and the other side of solenoid 750 is connected, by leads 756, 758, to lead 634. Thrust gate solenoid 760 is connected, at one of its sides, by leads 762, 764, to lead 754 and, at its other side by leads 766 and 768, to lead 758. Vertical gate solenoid 770 is connected, by lead 772, to lead 764 and, at its other side, by lead 774, to lead 768.

In the operation of the circuit of FIG. 5, each of the solenoids 600, 602, 604 are energized by leads A, B of the position control circuits, FIG. 4, of the respective axis. Thus, when all the switches 606, 608, 610, connected in series, are closed, solenoid 640 is energized closing switches 650, 652 to drive programmer motor 668 and to close and then reopen switch 674. When closed, switch 674, energizes solenoid 682 to reopen switches 650, 652, and the programmer is stepped one position. At the same time that switches 606, 608 and 610 are all closed, energizing solenoid 640, solenoids 750, 760, 770 are energized, reopening switches 606, 608, 610.

Concurrent with the closing of switches 606, 608, 610 and the energization of solenoids 640, 750, 760, 770, solenoid 694, on the feed back, is energized closing switch 700. With switch 700 closed, time delay motor 710 is driven and, after a pre-set interval, closes switch 726 and energizes solenoid 718 to reopen switch 700. While closed, switch 700 also energizes solenoid 730 and closes switch 736. When closed, switch 736 energizes solenoid 640, recloses switches 650, 652, reenergizes programmer motor which, in turn, closes switch 674, and energizes solenoid 682 to reopen switches 650, 652. Thus, programmer motor 668 rotates the timer drum a second step. When switch 700 is reopened, solenoid 730 is deenergized and switch 736 reopens.

As the circuitry of FIG. 5 and the operation thereof are hereinabove described, the apparatus of FIGS. 1 and 2 is operated, in all three axes, that is, the lateral axis, the thrust axis and the vertical axis. Should it be desired to operate the apparatus without movement in one or more axis, the sensor or sensors on such axes are not sensitized and no signal will be transmitted through leads A, B connected to the control circuit of such inactive, desensitized axes. In lieu of such signal when such axis is de-sensitized, the appropriate manual switch 780, 782, 784 is closed, by-passing the solenoid control switch of the de-sensitized, non-moving axes, be it the lateral, thrust, vertical axes or any combination thereof. Except for the manually controlled switch closed on the de-sensitized, non-moving axis, the balance of the circuit in FIG. 5 operates as heretofore described.

Figure 6:
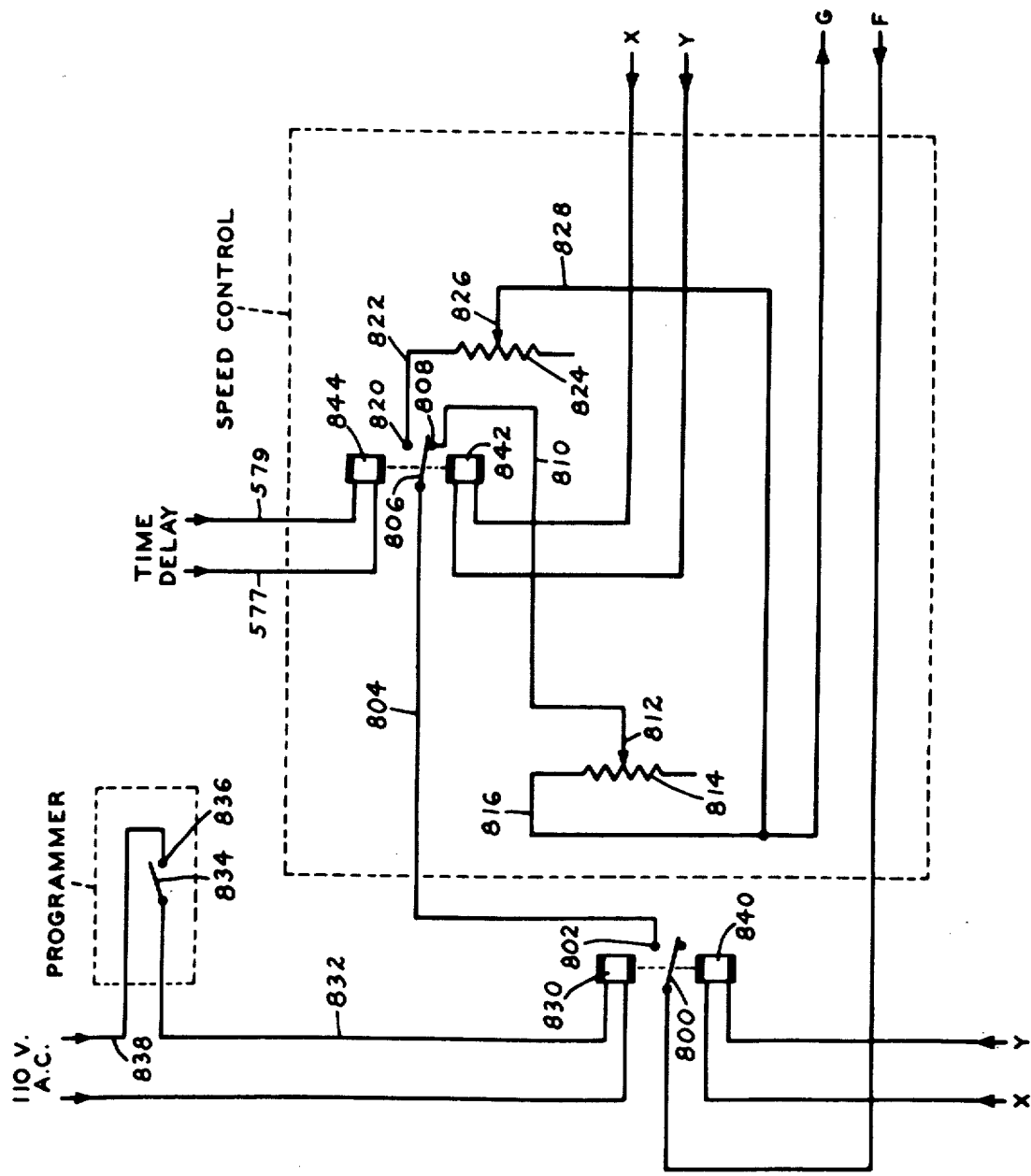
FIG. 6 is a schematic diagram of the speed control circuitry controlled from the speed control actuators of FIG. 4.

Referring now to FIG. 6, the speed of lateral motor 30, thrust motor 80 and vertical motor 122, may each be controlled by adding resistance into or removing resistance from leads F, G connected to D/C power supply 320, FIG. 3. The circuitry for such addition and substraction being shown, diagrammatically, in FIG. 6. While only two resistors and resistor circuits are shown in FIG. 6, it is to be understood that any number of such resistors may be added to and subtracted from the circuit of leads F, G, depending upon the number of speed variations desired in the machine and in the particular machine axis. As will be more apparent from the following description, where additional resistors and resistor circuits are employed each would be selectively connected with, and disconnected from, the respective motors in accordance with speed requirements.

In FIG. 6, lead F is connected to the arm of switch 800 and contact 802 of switch 800 is connected, by lead 804, to the arm of switch 806. Contact 808 of switch 806 is connected, by lead 810, to slide 812 of variable resistor 814. Slide 812 may be fixed or manually adjustable. Resistor 814 is connected, by lead 816, to lead G. Contact 820 of switch 806 is connected, by lead 822, to variable resistor 824. Slide 826, which may be fixed or manually adjustable, is connected, by lead 828, to lead G.

Solenoid 830 of switch 800 is connected, at one of its sides, to one side of the 110 V. A/C supply line and, at its other side, by lead 832, to the arm of programmer switch 834. Contact 836 of programmer switch 834 is connected, by lead 838, to the other side of the 110 V. A/C supply line. Solenoid 840 of switch 800 and solenoid 842 of switch 806 are connected to the X, Y leads. Solenoid 844 is connected to time delay leads 577, 579, FIG. 4.

In the operation of the speed control circuit of FIG. 6, switches 800 and 806 are in the position shown in FIG. 6, having been placed in such position by the energization of solenoids 840, 842, respectively, by contacts X, Y during the preceding programmer cycle, FIG. 5. Thus, to close the arm of switch 800 with contact 802 and connect the speed control circuit of FIG. 6 to the D/C power supply 320, FIG. 3, a detent on the programmer drum is positioned to close programmer switch 834. The speed control, at the speed determined by resistor 814 is then connected to leads F, G and D/C power supply 320 and the motor powered therefrom will operate at the appropriate speed.

Assuming that, as the apparatus is being moved along the axis at the speed determined by resistor 814 and is to be slowed down before reaching the sensor sensitized to stop the machine, the sensor at the point along the axis where the speed is to be reduced is sensitized and connected to the speed control actuator by a detent on the programmer drum which closes switch 486, FIG. 4. Thus, as the sensor actuator fixed to the machine moving along such axis passes the sensor sensitized by closed programmer switch 486, a signal is transmitted through leads 577, 579, FIG. 4, to solenoid 844, FIG. 6. Thus, solenoid 844 is energized, engages the switch arm of switch 806 with contact 820, disconnects resistor 814 and connects resistor 824 and the speed of the motor is reduced.

Figure 7:
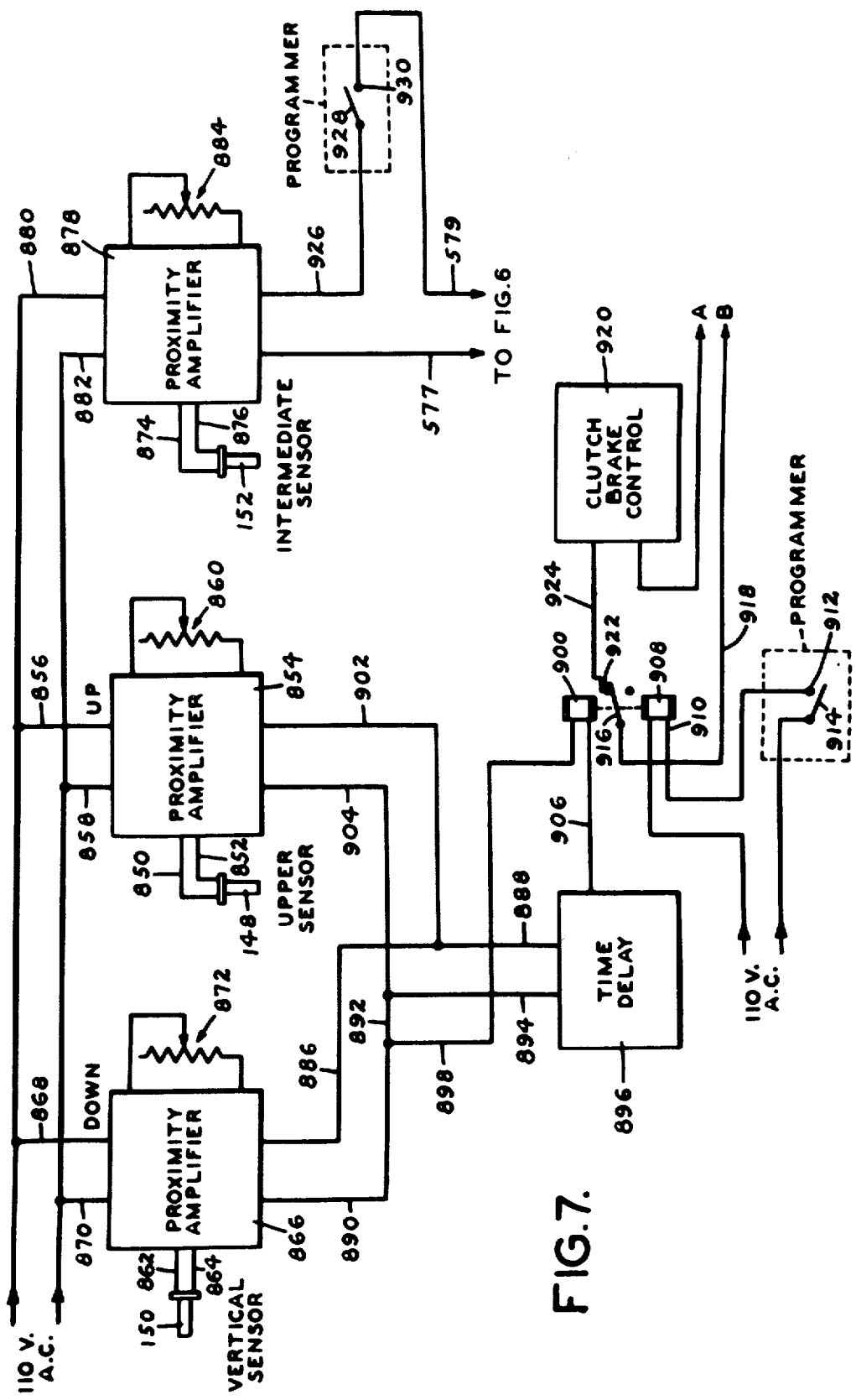
FIG. 7 is a schematic diagram of the sensor control circuitry and motor at the vertical axis of the apparatus of FIGS. 1 and 2.

Referring next to FIG. 7, the apparatus of the instant invention may be controlled by programming lateral motor 30, thrust motor 80 and vertical motor 122, through the motor control circuitry of FIG. 4 or, as is preferred, vertical motor 122 may be controlled through the circuitry of FIG. 7. In such control, sensor 148 is connected by leads 850, 852 to proximity amplifier 854 in turn connected by lead 856 to one side of the 110 V. A/C supply line and by lead 858 to the other side of the 110 V. A/C supply line. The signal output of amplifier 854 is manually adjusted by potentiometer, generally designated 860. Sensor 150 which, as will be later described, controls the vertical position of head 126, when sensor 150 is sensitized and the head is being moved vertically downward, is connected by leads 862, 864 to proximity amplifier 866 which, in turn, is connected by leads 868, 870 to the opposite sides of the 110 V. A/C supply line. The output of proximity amplifier 866 is controlled by manually adjustable potentiometer 872. Sensor 152 which is mounted on head 126 intermediate sensors 148, 150 and, when sensitized, controls motor speed, as will be hereinafter described, is connected by leads 874, 876 to proximity amplifier 878, in turn connected by leads 880 and 882 to the opposite sides of the 110 V. A/C supply line. Manually adjustable potentiometer, generally described 884, controls the signal output of proximity amplifier 878. Proximity amplifier 866 is connected, by leads 886, 888 and by leads 890, 892, 894 to time delay 896 and by leads 890, 898 to one side of solenoid 900. Proximity amplifier 854 is connected by leads 902, 888 and 904, 894 to time delay 896 and by leads 904, 892 and 898 to one side of solenoid 900. Time delay 896 is connected by lead 906 to the other side of time delay 900. Solenoid 908 is connected, at one of its sides, to one side of the 110 V. A/C supply line and, at its other side, by lead 910 to contact 912 of programmer switch 914. The arm of programmer switch 914 is connected to the other side of the 110 V. A/C supply line.

The arm of latcher switch 916, controlled by solenoids 900, 908 is connected by lead 918 to lead B, FIG. 5. Contact 922 of switch 916 is connected by lead 924 to clutch-brake control line 920 and through the clutch-brake control to lead A, FIG. 5. Proximity amplifier 878 is connected, at one side, to lead 577, FIG. 4, and at its other side through lead 926 to the arm of programmer switch 928. Contact 930 of programmer switch 928 is connected to lead 579, FIG. 4.

In the operation of vertical motor 122 with sensors 148, 150, 152, FIG. 7, the clutch of clutch-brake 120 is engaged, through clutch-brake control 920, by a detent on the programmer drum which closes switch 914, energizes solenoid 908 and disengages the arm of switch 916 from contact 922. In some cases it is desired during the movement of head 126 to slow its downward movement by intermediate sensor 152 before such head is stopped by sensor 150. In such cases a detent on the programming drum closes the arm of switch 928 with contact 930 at the time that the programmer is indexed, through the circuitry of FIG. 5, to close programmer switch 914.

As head 126 moves down and sensitized sensor 152 is energized, a signal is transmitted through leads 577, 579 to solenoid 844, FIG. 6, in the control circuitry of D/C power supply 320 of motor 122 and through leads F, G, FIGS. 3 and 6, motor 122 is slowed down. When the head 126 reaches the sensitized position of sensor 150, a signal is generated through leads 862, 864 to proximity amplifier 866 and, from the proximity amplifier and through the connecting leads and time delay 896 to energize solenoid 900. The arm of switch 916 is thereby closed with contact 922 and clutch-brake control 920 disengages the clutch and re-engages the brake of clutch-brake 120, FIG. 2.

Similarly, when head 126 is to be moved in the upward direction, a detent on the programmer closes switch 914 and, when the head approaches sensor 148 a signal is generated, solenoid 900 is energized and clutch-brake control 920 releases the clutch and engages the brake of clutch-brake 120, FIG. 2.

As hereinabove described, the apparatus of the instant invention is controlled by sensors mounted in fixed position along the lateral and thrust axes which, through the described circuitry, control lateral motor 30 and thrust motor 80 and by sensors on head 126 which control vertical motor 122. In addition to such controls with such sensors, the apparatus may be controlled along the lateral and thrust axes by sensors positioned on the head. In such arrangement the head is provided with fingers, rather than suction cup 140. The apparatus for this arrangement is shown in FIG. 8.

Referring to FIG. 8, head 126' has a fixed finger 128' and a movable finger 130'. Double acting cylinder 132' having fluid pressure inlet 134' and fluid pressure outlet 136' and a piston rod 138' is mounted on movable finger 130' and piston rod 138' is connected to fixed finger 128'. Double acting cylinder 132' opens and closes fingers 128', 130'. Vertical sensor 150 is mounted intermediate fingers 128', 130'. Thrust sensors 160' and 162' are mounted on head 126' with the sensor head of sensor 160' facing forwardly between fingers 128', 130' and the sensor head of sensor 162' facing rearwardly. Lateral sensors 164', 166' face lateral outwardly from the opposite lateral side of head 126' with the sensitized heads facing outwardly and away from head 126'. Photocell 170' is mounted in fixed finger 128' and faces reflector 172' mounted in movable finger 130'. As will be described, photocell 170' is connected to a solenoid valve not shown, for actuating double acting cylinder 132' to close fingers 128', 130'. Such valve for actuating cylinder 132' is also connected to the programmer for opening fingers 128', 130'.

In the operation of the apparatus the sensors on head 126', FIG. 8, will seek out, find, locate and engage the object. In order that this can be done, the sensors on head 126' must be sensitized so that head 126' will first be removed downwardly toward the work supporting table and stopped by vertical sensor 150, will then be moved laterally and stopped by sensor 164' or 166', depending upon the direction in which lateral motor 30 is energized and, thereafter, will move forward, in the thrust direction until forward or thrust throttle is stopped by sensor 160'. When head 126' has moved in the vertical, lateral and thrust directions and is stopped by sensor 160' the article to be engaged will be between fingers 128', 130' and double acting cylinder 132 will be actuated by the interruption of the signal from reflector 172' back to photocell 170'. In order that the apparatus controlled by the sensors on head 126', FIG. 8, will be actuated first vertically, then laterally, then forward on the thrust axes, the sensors are sensitized, one after the other, by the programmer motor which is twice stepped, as hereinabove described, at the end of movement in each direction. In order that the programmer motor may be so stepped, while vertical movement, without lateral and thrust movement, is taking place, lateral switch 780 and thrust switch 782, FIG. 5, are closed, either manually or by detents on the programmer. During lateral movement, thrust switch 782 and vertical switch 784 are closed and, during thrust movement lateral switch 780 and vertical switch 784 are closed.

Referring to FIG. 9, the head movement of the apparatus of the instant invention is shown, diagrammatically, as it is moved through an illustrative pattern. The machine is programmed, by the circuitry hereinabove described, to return to position A after each programmed operation. From position A, the machine is programmed to move the head vertically downward to position B and then to the right, as viewed from the front of the machine, to position C. Next, the machine moves the head forward to position D where the article, to be picked up and moved, is engaged and the fingers on the head are closed, as hereinbefore described, to grip the article.

If the article to be engaged and moved is located at a predetermined position on the table and is to be picked up from the top of the article, such as by the suction cup of FIGS. 1 and 2, the machine may be programmed, as hereinabove described, to move in the vertical, horizontal and thrust directions, simultaneously, and to stop, in each direction, when it reaches it programmed position. If, however, the article is not located at a predetermined position and the sensors for all three axes, such as shown in FIG. 8 and described in connection therewith, are used, then movement must be completed in the vertical axis before such movement commences in the horizontal and thrust axes. Likewise, movement must be completed horizontally, or longitudinally, before thrust movement. Loss of time in such movement along individual axes can be minimized by programming the starting position A as close as possible to the area where the article will be located.

After the article is engaged at position D, the head and article gripped therein, are moved to position E and then to position F. In the illustrated embodiment, at position F, the article is fed to a drill and a hole is drilled in the article. Such drill, or other accessory to which such article is fed, may be operated continuously, turned on by a suitable switch, not shown, on the programmer, or by a sensor at the accessory past which the head and article move as such article is being fed to the accessory.

From position F, the apparatus is programmed to move the head to position G, then to H and vertically upward to position I and back to position J where, through a switch on the programmer, the article is released. The head is then raised to position K through the programmer and returns to position A.

In the operation illustrated in FIG. 9, the head stacks one article on the other. Thus, the apparatus is programmed so that after each article is stacked, the next article will be stacked one article higher. This may be accomplished by so programming the apparatus. However, in most cases the stacking altitude will be sensed by the appropriate sensor which will cause each succeeding article to be deposited on the preceding article.

For reasons discussed above, movement of the head along the respective axis from position G to position J may occur simultaneously and the speed of the overall operation will thereby reduced.

As is obvious from the foregoing description, the movement of the head might be controlled by the programmer with the sensors located along the respective axis of the work area. In such operation, however, each axis would be sensitized and movement of the head completed in each axis before the other axis was sensitized and the head was moved in such other axis.

The apparatus of the instant invention may be controlled by a still further head-mounted sensor to roughly locate the desired object and place the head 126 or 126' in a position sufficiently close to the desired object that it may be picked up by suction cup 140 or between fingers 128' and 130'. The additional sensor is triggered by the presence of the desired object within a defined optical field of view in front of the head 126 or 126'. The sensor is detachable for operations where its use is unnecessary. The apparatus for this arrangement is explained hereinafter with reference to FIGS. 1, 9 and 10.

A photometric sensor in the form of a spotlight meter 932 is bolted to the head 126. Although not shown in FIG. 8, the spotlight meter 932 may also be bolted to the head 126'. The spotlight meter 932 is focused manually to a predetermined setting appropriate for the size of the area and object to be scanned. The limits for the setting are approximately three free to infinity.

Referring now more particularly to FIG. 10, the spotlight meter 932 has a 1° optical field of measurement and is self-adjusting to the ambient light conditions. In other embodiments the field of view may be 3° or even broader depending on the selectively required. When an object enters this field, a voltage will be generated at the output leads 934 and 936 from the spotlight meter 932. The output voltage is directly proportional to the difference between the background or ambient light conditions and the light reflected from the sensed object.

The photometric output voltage is applied through the leads 934 and 936 to opposite sides of a parallel circuit comprising a motor 938, a variable resistor 940, and a full wave rectifier bridge 942. The motor 938 moves the sliding arm of a null bridge (not shown) within the spotlight meter 932 to cancel the output voltage. This constitutes the "self-adjusting" feature of the spotlight meter 932. The spotlight meter adjusts, through the motor 938 and the null bridge to the ambient or background lighting conditions until no output voltage is produced.

When light is reflected from an object suddenly appearing in the spotlight meter's field of view, however, an output voltage is produced across leads 934 and 936 while the meter self-adjusts to the new lighting conditions. The resistor 940 shunts the motor 938 to suppress transient signals generated by the motor itself.

This output voltage across leads 934 and 936 is rectified by the diode rectifier bridge 942. The positive (+) output of the bridge is applied to the circuit ground by lead 944. The negative (−) output of the bridge is applied to the input lead 946 of a Schmitt trigger circuit 948. The Schmitt trigger circuit 948 is comprised of various transistors, resistors, capacitors, and a diode in a conventional circuit. The component values shown in FIG. 10 are by way of example only, it being recognized that various other combinations could be utilized.

The circuit has a positive feedback so that when a voltage of predetermined magnitude is generated by the sensor 932 across the bridge 942, the Schmitt trigger circuit 948 will give a symmetrical square wave output at lead 950 as long as the voltage of predetermined magnitude is present at the input 946. The output from the Schmitt trigger is applied through the lead 950 to one side of a solenoid 952. The other side of the solenoid 952 is connected to the circuit ground by a lead 954. The required predetermined voltage level for the trigger input is selected to be sufficiently large to exclude undesired objects and prevent false triggering.

The solenoid 952, when energized, closes the arm of a switch 956 with a contact 958 and the arm of a switch 960 with a contact 962. The contact 958 is connected to the lead 530 of FIG. 4. The contact 962 is connected by a lead 964 to the arm of a programmer switch 966. The contact 968 of the switch 966 is connected to the lead 528 of FIG. 4. The contact arm of the switch 956 is connected by leads 970 and 472 to one side of the 110 V. A/C supply line. The arm of the switch 960 is connected by leads 972 and 482 to the other side of the 110 V. A/C supply line. The photometric sensor 932 is sensitized by the closing of the programmer switch 966.

In operation the head 126 or 126' descends to the operating surface where its height is sensed by the sensors 150 and 152. The area is scanned by lateral movement of the head until the desired object comes within the field of view of the photometric sensor 932. When the object comes within the field of view the output from the sensor will cause the Schmitt trigger circuit 948 to generate a square wave output of duration proportional to the amount of light reflected from the object.

The output from the Schmitt trigger circuit 948 energizes the solenoid 952 and thereby closes switches 956 and 960. The closing of these switches applies power from the 110 V. A/C supply line through the leads 528 and 530 to solenoid 532 of FIG. 4. This energizes solenoid 532 and opens switch 534 which disengages the clutch-brake control, thereby stopping the lateral movement of the head 126 or 126'. The operation of the apparatus thereafter follows the sequence described above in reference to FIGS. 4 or 8, depending upon which head 126 or 126' is used.

Because the output at lead 950 from the Schmitt trigger 9 8 is a substantially symmetrical square wave and has a duration proportional to the amount of light reflected from the object within the field of view of the photometric sensor 932, the circuitry of FIG. 10 is capable of distinguishing between objects of different reflective characteristics. The primary distinguishable reflective characteristic is color. In some embodiments logic circuitry is interposed between the output at lead 950 and the solenoid 952 which counts the number of square waves to distinguish between dark colored objects and light colored objects. Greater variation in the sensor's color distinguishing capability may be accomplished by adding color filters to the optical input to the spotlight meter 932.

Thus the photometric sensor 932 and the related circuitry of FIG. 10 allows the apparatus of the invention to position the operating head in near proximity to the object which is to be picked up and is capable of distinguishing between objects by their light reflective characteristics.

The terms and expressions which have been employed are used as terms of description and not of limitation, and there is no intention in the use of such terms and expressions of excluding any equivalents of the features shown and described or portions thereof, but it is recognized that various modifications are possible.

What is claimed is:

1. In an automatic article manipulator which includes an article engaging head movably mounted on a frame and an article responsive sensor mounted on said head, the method of searching for and locating a randomly positioned article which comprises the steps of:
    a. moving said article engaging head;
    b. sensing for the presence and location of an article while said head is moving; and
    c. stopping the movement of said head when the presence and location of an article is detected.

2. The process of claim 1 wherein said sensing step comprises sensing for light reflected from said article.

3. The process of claim 2 wherein movement of said head is stopped when reflected light of a particular frequency is detected.

4. The process of claim 2 which further includes the step of determining the intensity of the light reflected from said article.

5. The process of claim 2 which further includes the step of passing said reflected light through a color filter whereby articles to be engaged may be distinguished by their color.

6. The process of claim 2 wherein articles to be engaged are distinguished by distinguishing between their light reflective characteristics.

* * * * *

UNITED STATES PATENT OFFICE
CERTIFICATE OF CORRECTION

PATENT NO. : 3,895,729
DATED : July 22, 1975
INVENTOR(S) : William J. Dukette

It is certified that error appears in the above-identified patent and that said Letters Patent are hereby corrected as shown below:

COVER PAGE [60] Line 3 "1974" should be --1970--.

Column 4, Line 14, "mbr" should be --member--.

Column 9, Line 13, before connected "in" should be --is--.

Column 9, Line 60, "axiss" should be --axis--.

Signed and Sealed this ninth Day of December 1975

[SEAL]

Attest:

RUTH C. MASON
Attesting Officer

C. MARSHALL DANN
Commissioner of Patents and Trademarks